Figure 1:
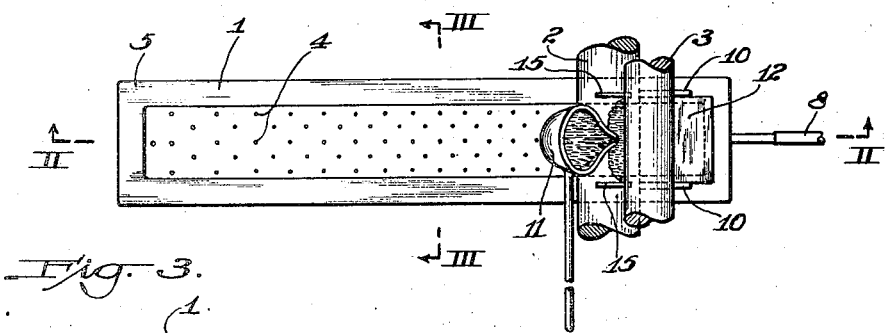

July 4, 1944.  R. W. KELL  2,352,957

METHOD OF FORMING GLASS ARTICLES

Filed March 6, 1942

WITNESSES.
B. Wallace.

INVENTOR.
Raymond W. Kell
BY Brown, Critchlow & Flick
ATTORNEYS.

Patented July 4, 1944

2,352,957

UNITED STATES PATENT OFFICE 2,352,957

METHOD OF FORMING GLASS ARTICLES

Raymond W. Kell, Charleroi, Pa., assignor to Corning Glass Works, Corning, N. Y., a corporation of New York Application March 6, 1942, Serial No. 433,616

4 Claims. (Cl. 49—85)

The invention relates to methods of forming glass articles, and has to do particularly with the manufacture of relatively large glass articles of elongate form having open sides, as exemplified by trough-like translucent enclosures for fluorescent and lighting tubes.

Attempts have been made to form such enclosures by placing a sheet-like layer of plastic translucent glass upon a horizontal perforated plate, applying to the top of the glass an inverted double-wall mold whose inner wall was provided with a large number of small openings, and applying suction through the mold openings to the glass to cause it to conform to the mold. It was found to be quite difficult thus to cause a large plate or strip of plastic glass uniformly to expand and conform to the mold, and additionally it was found that an uneven cooling of the glass caused by streams of air flowing on it through the openings in the bottom plate resulted in easily observable, and hence prejudicial, spotty variations in the translucency of glass in the formed enclosure.

Because of these and other difficulties encountered in the procedure just explained, trough-like enclosures of the form and type here contemplated are, as far as known to me, being formed in pairs in suitable closed molds by manual blowing of manually prepared gathers of glass. On account of the splitting and trimming essential to this hand procedure, it is quite expensive. Also, it is practically impossible, or at least very difficult, thus to form these enclosures with the desired uniformity of wall thickness throughout.

According to my invention, an elongate relatively large glass article, exemplified by trough-like enclosures of the type explained above, is formed in an elongate concave mold by positioning the mold with its open side upwardly, and then applying to the mold throughout its full width a sheet-like body of glass heated to molding plasticity and conforming the glass to the mold by applying suction below the glass through the wall of the mold. The sheet-like body of glass is applied to the mold progressively from one to the other of its ends, this preferably being done by forming the body from molten glass by a pair of rolls while the mold is moved below the delivery side of the rolls to receive the glass.

My invention is predicated primarily upon my discovery that in thus forming such an article it is necessary to apply suction through the wall of the mold throughout the major portion of the time during which the glass is progressively fed to the top of the mold. Specifically, I have found that when this is done the glass is caused so to expand and flow that it conforms to the mold in substantially uniform thickness throughout the article being formed, and that when this is not done the uncontrolled plastic glass so sags into the mold and so flows upon itself that longitudinally extending beads or plaits are formed which are much thicker than the desired wall thickness of the article, and that the wall of glass extending above these beads is much thinner than desired. Preferably suction is applied below the glass throughout the entire period of its progressive application to the mold, and thereafter until the glass is fully conformed to the mold. Also, I have found it advantageous to have the volumetric capacity of the suction adjacent to the end of the mold to which the glass is first applied greater than that adjacent to the other end of the mold. This variation in the suction capacity facilitates the formation of articles having substantially uniform wall thickness from end to end.

Figure 3:
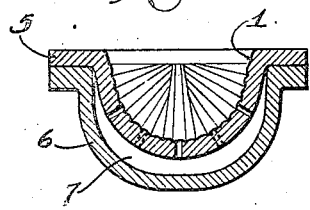
Figure 2:
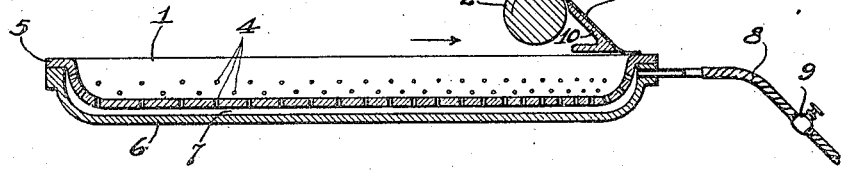
Figure 4:
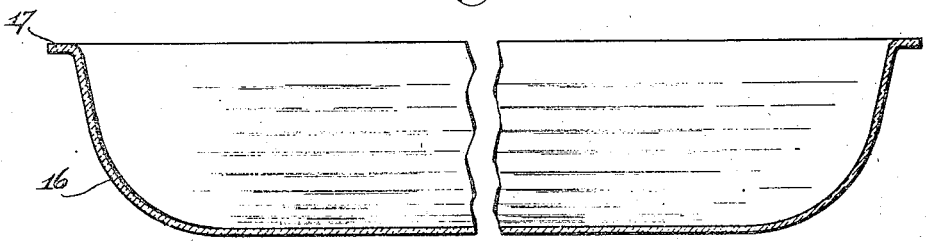

The invention will be further explained with reference to the accompanying drawings which diagrammatically illustrate the principal elements of a machine on which the invention may be practiced. Fig. 1 is a plan view of the machine; Fig. 2 a vertical longitudinal central sectional view taken on the line II—II of Fig. 1; Fig. 3 a vertical transverse sectional view taken on the line III—III of Fig. 1; Fig. 4 a longitudinal central sectional view, to enlarged scale, of a trough-like enclosure for a fluorescent lighting tube adapted to be formed on the machine; and Fig. 5 a transverse sectional view of the enclosure shown in Fig. 4.

The principal elements of the machine here illustrated comprise an elongate mold 1 and a pair of rolls 2 and 3 positioned above the mold for forming and delivering to it a sheet or strip-like body of glass heated to molding plasticity. The mold is positioned with its open top upwardly lying in a horizontal plane, and is provided with a plurality of small openings generally indicated at 4, and with a laterally extending peripheral flange 5. The exterior wall of the mold is enclosed in a casing 6, which, with the mold, forms a chamber 7 that is in communication with mold openings 4. By a flexible conduit 8, chamber 7 may be placed in communication with a suction pump or other instrumentality for withdrawing air from the chamber, such conduit being provided with a valve 9 for this purpose.

Rolls 2 and 3, positioned above mold 1, are adapted to be rotated in the direction indicated by the arrows shown on them in Fig. 2. From the lower side of these rolls an apron 10 inclines downwardly to the general plane of the open top of the mold.

At the beginning of each forming operation mold 1 is positioned substantially as shown in Figs. 1 and 2, or in other words, with its right-hand end, as there viewed, lying below the lower edge of apron 10. Molten glass is poured, as from a ladle 11, into the bite of rolls 2 and 3 which are then rotated to form between them a strip-like body of glass 12 and to move such body downwardly upon apron 10 to the top of mold 1 and its flange 5. When the leading end of the body of glass is laid upon flange 5 at the right-hand end of the mold, the mold is suitably moved to the right, as indicated by the arrow on it in Fig. 2, at the rate of delivery of the glass to it until the trailing end of the body of glass lies upon the portion of flange 5 at the left end of the mold. The amount of molten glass fed to the rolls for each forming operation is preferably so measured that there may be formed from it a strip of sufficient length to cover the mold from one to the other of its ends. Any excess length of this strip may readily be cut at the left end of the mold while the glass is still hot. To determine the width of the body or strip of glass 12, a pair of laterally adjustable blocks or dams 15 are positioned on the top or entering side of rolls 2 and 3, as illustrated.

The body of glass 12 laid upon the mold sags downwardly into the mold as the latter is progressively moved to the right and is caused to conform to the mold by opening valve 9 in conduit 8 to apply suction through the conduit chamber 7 and openings 4 to the lower face of the expanding glass. While the glass may be laid upon a portion of the mold before such application of suction, such portion should be less than half of the length of the mold. If this is not done, the uncontrolled sagging plastic glass is liable to flow unevenly upon itself and form longitudinally extending beads or plaits, the layers of glass above which are much thinner than desired. Preferably, suction is applied during the entire period of the application of the glass to the mold and thereafter until the glass is conformed to it. Also, to facilitate the forming of articles having uniform wall thickness from end to end, the volumetric capacity of the suction is preferably made greater adjacent to the right than to the left end of the mold, or in other words adjacent to the end of the mold to which the glass is first applied. This increase in volumetric capacity of the suction may be effected, as shown in Figs. 1 and 2, by increasing the number of openings 4 at the right end of the mold as compared with those at the left.

Figure 5:
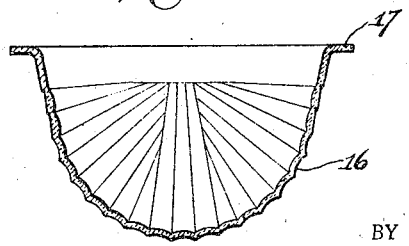

In the commercial practice of this invention I have found that large enclosures for fluorescent lighting tubes may be formed with substantially uniform wall thickness from end to end, and that the translucent glass of which they are formed is of uniform translucency throughout. Such an enclosure is illustrated in Figs. 4 and 5 of the drawing, the enclosure having a substantially semi-cylindrical body 16 and a peripheral mounting ledge 17. As illustrated particularly in Fig. 5, the exterior of body 16 is provided with longitudinal concave flutes which advantageously spread the light transmitted through the enclosure and enhance its appearance, the face of mold 1 being shaped to form the flutes, as indicated in Fig. 3. The particular enclosure here illustrated is about four and one-half feet in length and about five and one-half inches in width, although it is understood that larger or smaller enclosures and other like articles may be made according to the invention.

According to the provisions of the patent statutes, I have explained the principle of my invention and have described and illustrated what I now consider to be the best way of practicing it. However, I desire to have it understood that, within the scope of the appended claims, the invention may be practiced otherwise than as specifically described and by the use of apparatus differing from that diagrammatically illustrated.

I claim:

1. The method of forming a glass article, comprising positioning with its open side upwardly a mold provided with an elongate concave molding surface, applying to said mold throughout its whole width and progressively from one to the other end thereof a sheet-like body of glass heated to molding plasticity, and conforming said glass to the mold by applying suction below the glass through the wall of the mold throughout the major portion of the time during which glass is progressively applied thereto and thereafter until the glass is conformed thereto.

2. The method of forming a glass article, comprising positioning with its open side upwardly a mold provided with an elongate concave molding surface, applying to said mold throughout its whole width and progressively from one to the other end thereof a sheet-like body of glass heated to molding plasticity, and conforming said glass to the mold by applying suction below the glass through the wall of the mold throughout the entire period of said application of glass thereto and thereafter until the glass is conformed thereto.

3. The method of forming a glass article, comprising positioning with its open side upwardly a mold provided with an elongate concave molding surface, applying to said mold throughout its whole width and progressively from one to the other end thereof a sheet-like body of glass heated to molding plasticity, and conforming said glass to the mold by applying suction below the glass through the wall of the mold throughout the major portion of the time during which glass is progressively applied thereto and thereafter until the glass is conformed thereto, the volumetric capacity of such suction being greater adjacent to the end of the mold to which the glass is first applied than adjacent to the other end thereof.

4. The method of forming a glass article, comprising positioning with its open side upwardly a mold provided with an elongate concave molding surface, applying to said mold throughout its whole width and progressively from one to the other end thereof a sheet-like body of glass heated to molding plasticity, and conforming said glass to the mold by applying suction below the glass through the wall of the mold throughout the entire period of said application of glass thereto and thereafter until the end is conformed thereto, the volumetric capacity of such suction being greater adjacent to the end of the mold to which the glass is first applied than adjacent to the other end thereof.

RAYMOND W. KELL.